(12) United States Patent
Wilson

(10) Patent No.: US 8,607,738 B2
(45) Date of Patent: Dec. 17, 2013

(54) CAT COLLECTION BOX

(71) Applicant: George Wilson, Pittsburgh, PA (US)

(72) Inventor: George Wilson, Pittsburgh, PA (US)

(*) Notice: Subject to any disclaimer, the term of this patent is extended or adjusted under 35 U.S.C. 154(b) by 0 days.

(21) Appl. No.: 13/743,426

(22) Filed: Jan. 17, 2013

(65) Prior Publication Data

US 2013/0186344 A1    Jul. 25, 2013

Related U.S. Application Data

(60) Provisional application No. 61/588,775, filed on Jan. 20, 2012.

(51) Int. Cl.
*A01K 1/035* (2006.01)

(52) U.S. Cl.
USPC .......................................... 119/165; 119/161

(58) Field of Classification Search
USPC .......... 119/161, 162, 165, 268; 206/457, 567, 206/1.5; 220/576, 502
See application file for complete search history.

(56) References Cited

U.S. PATENT DOCUMENTS

| | | | | |
|---|---|---|---|---|
| 2,390,854 A | | 12/1945 | Thompson | |
| 3,836,037 A | * | 9/1974 | Bass | 220/264 |
| 4,271,544 A | | 6/1981 | Hammond | |
| 4,327,667 A | * | 5/1982 | Bilak | 119/166 |
| 5,216,979 A | | 6/1993 | Sallee et al. | |
| 6,439,161 B1 | | 8/2002 | Clemmons | |
| 6,848,394 B1 | | 2/2005 | Sexton | |
| 7,082,892 B1 | | 8/2006 | Fraser et al. | |
| 2011/0185976 A1 | * | 8/2011 | Egy | 119/162 |

* cited by examiner

*Primary Examiner* — Rob Swiatek
*Assistant Examiner* — Lisa Tsang
(74) *Attorney, Agent, or Firm* — McKay & Associates, P.C.

(57) ABSTRACT

A cat litter box having a side wall defining an interior and a bottom surface within the interior formed from a main door and multiple secondary doors which form on opening. Each door includes a slat connected below the slatted edge on an underside thereof traveling most of a length of the slatted edge, and the doors are hingedly attached to the side wall of the housing. Provided is a means for manipulating the main door upwards and downwards such that the main free edge can be pushed against the slat of an adjacent one of the secondary doors to provide a downward force against each the secondary door to reveal the opening. In this manner, any contained soiled litter can periodically be dumped and the contents removed, resulting in an easy-to-use, sanitary cat litter box system.

4 Claims, 4 Drawing Sheets

CAT COLLECTION BOX

CROSS-REFERENCE TO RELATED APPLICATIONS

The instant application claims benefit established by provisional application Ser. No. 61/588,775 filed Jan. 20, 2012, the contents of which are incorporated herein by reference.

BACKGROUND

1. Field of the Invention

The instant invention relates to cat litter boxes. In particular, described is a cat litter container for entrapping soiled cat litter utilizing a trap-door mechanism.

2. Description of the Prior Art

A variety of cat litter boxes are known in the art. For instance U.S. Pat. No. 5,216,979 discloses a toilet bowl mountable trap door cat litter box. U.S. Pat. No. 6,848,394 discloses a cat litter box having a trapdoor mechanism. U.S. Pat. No. 4,271,544 discloses a commode for animals having a trapdoor. U.S. Pat. No. 2,390,854 discloses an animal toilet having a pull receptacle. U.S. Pat. No. 6,439,161 discloses a litter box having a pivoting receptacle. U.S. Pat. No. 7,082,892 discloses a cat litter box having two hinged bottom trap doors.

Cat litter boxes containing soiled litter are sifted at least once a day, and waste is removed frequently. Although necessary, this process can be highly unpleasant and unsanitary, as people have to bend over to get close to the litter box in order to use the scoop. They must then dump the litter and waste into a bag or down the toilet. If any of the litter or waste spills during this process, the owner has to pick it up. To prevent this from happening, some cat owners may not clean out their cat's litter box as often as they should.

Many of the above devices which attempt to ease the burden of disposing of soiled cat litter suffer greatly in that they are complicated and expensive and, additionally, significantly change the cat's traditional environment. Accordingly, there is a need to provide a device which simplifies the process of removing soiled litter.

SUMMARY

The invention comprehends a cat litter box, comprising a housing having a side wall defining an interior and a bottom surface within the interior formed from a main door and multiple secondary doors. Two of the secondary doors are adjacent to the main door each on either side thereof and each secondary door is triangular in shape having a connecting edge, a slatted edge, and an un-slatted edge. The secondary door further includes a slat connected below the slatted edge on an underside thereof traveling most of a length of the slatted edge and the connecting edge is hingedly attached to the side wall. The main door is also triangular in shape having a fixed edge, a main slatted edge and a main free edge. Finally, provided is a means for manipulating the main door upwards and downwards such that the main free edge can be pushed against the slat of an adjacent one of the secondary doors to provide a downward force against each the secondary door to reveal the opening, and the slatted edge can be pulled upward against the slat of the other of the adjacent secondary doors to close the opening and re-form the bottom surface. In this manner, any bottom box containing the soiled litter can periodically be dumped and the contents removed, or the housing (top box) itself can be emptied into a trash container, resulting in an easy-to-use, sanitary cat litter box system.

DETAILED DESCRIPTION OF THE PREFERRED EMBODIMENT

The invention will now be described in detail in relation to a preferred embodiment and implementation thereof which is exemplary in nature and descriptively specific as disclosed. As is customary, it will be understood that no limitation of the scope of the invention is thereby intended. The invention encompasses such alterations and further modifications in the illustrated assembly, and such further applications of the principles of the invention illustrated herein, as would normally occur to persons skilled in the art to which the invention relates. This detailed description of this invention is not meant to limit the invention, but is meant to provide a detailed disclosure of the best mode of practicing the invention. "A" or "an" as used in the disclosure and claims means one or more.

Figure 1:
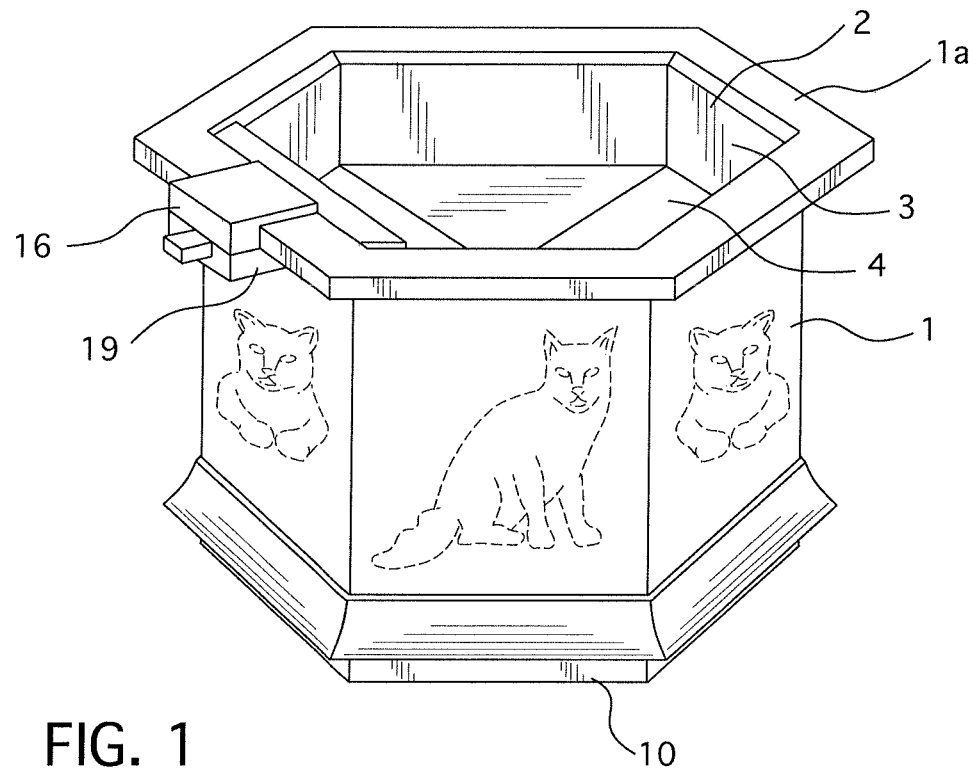
FIG. 1 shows a perspective view the litter box with the latch means in the closed position.
Figure 2:
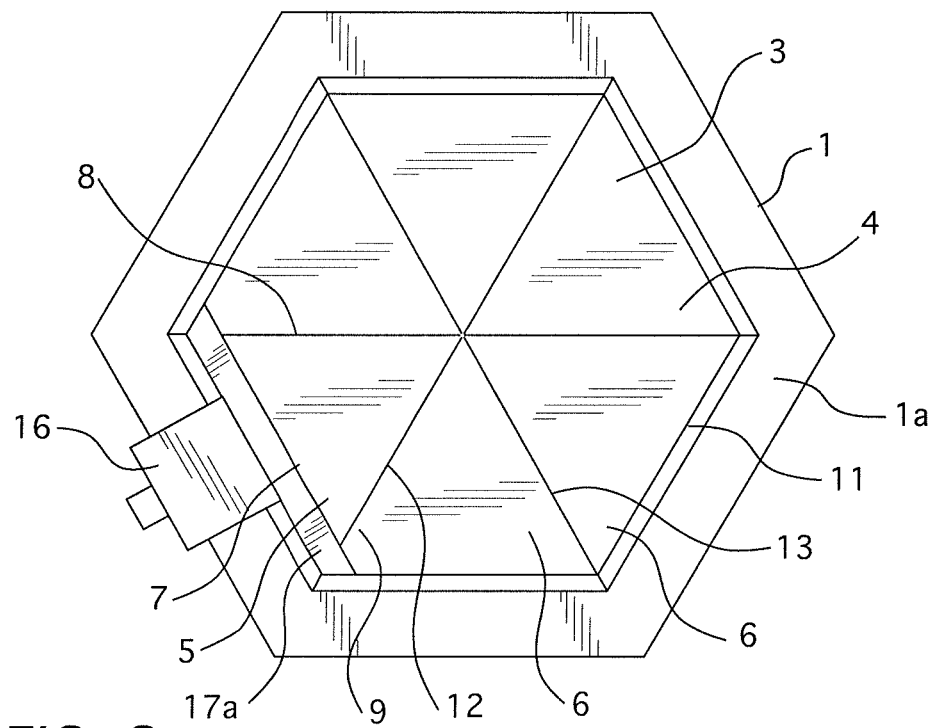
FIG. 2 shows a top plan view of the litter box.
Figure 3:
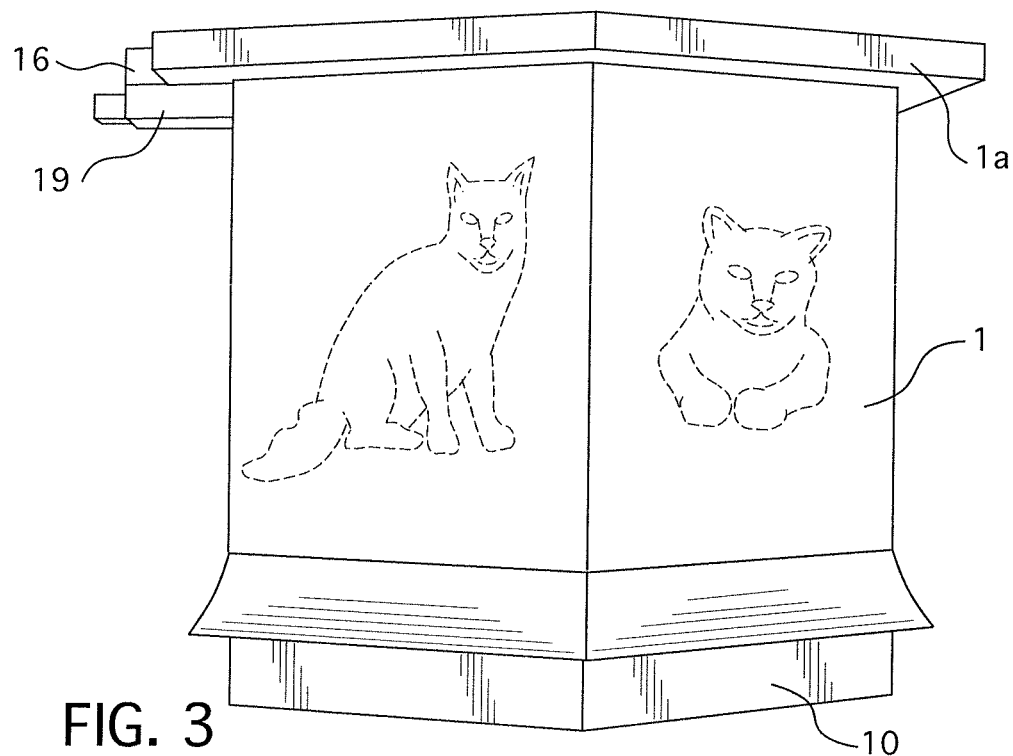
FIG. 3 shows a side elevation view of the litter box.
Figure 4:
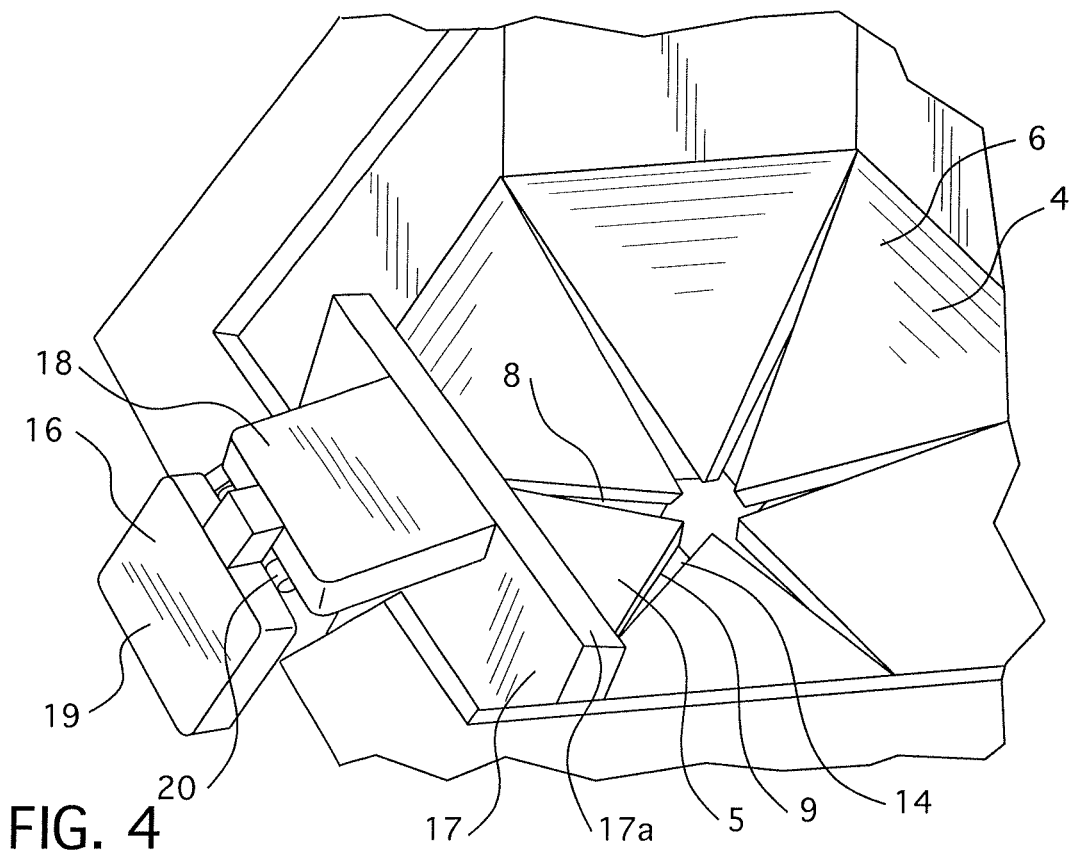
FIG. 4 shows a partial and enlarged perspective view of the litter box with the latch commencing into an open position.
Figure 5:
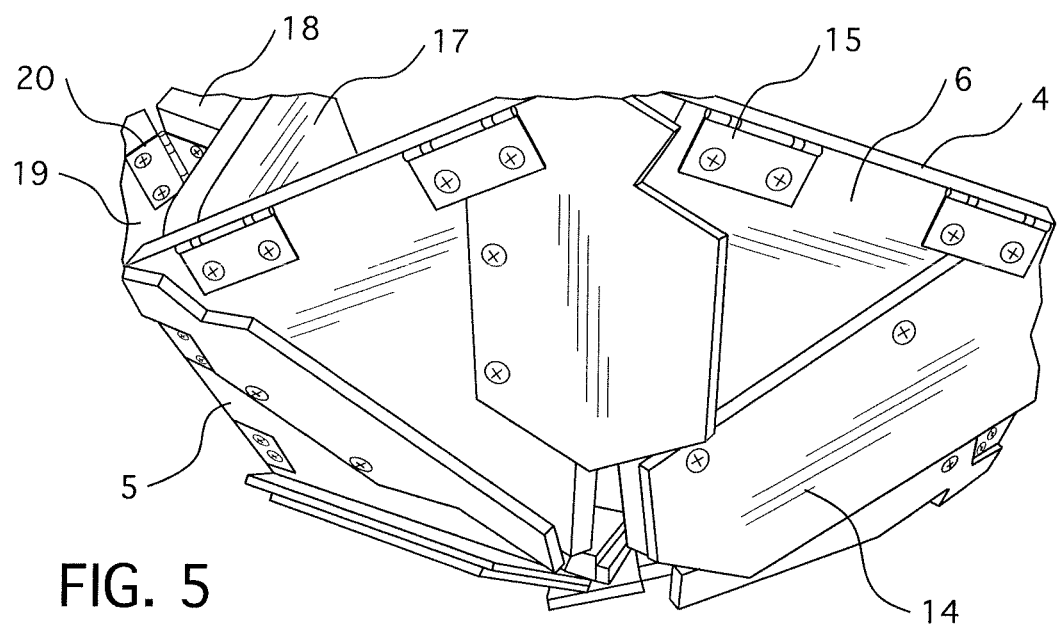
FIG. 5 shows a perspective view of the bottom of the litter box with the bottom surface partially open.
Figure 6:
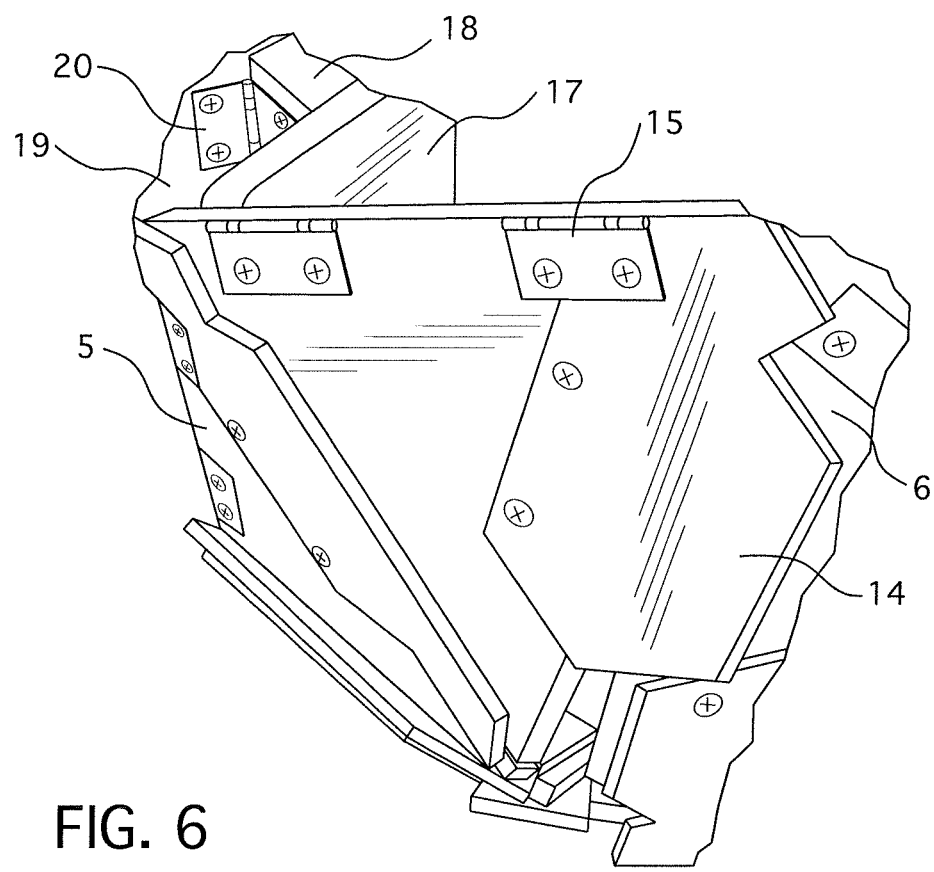
FIG. 6 shows a perspective view of a single, secondary door forming part of the bottom surface.
Figure 7:
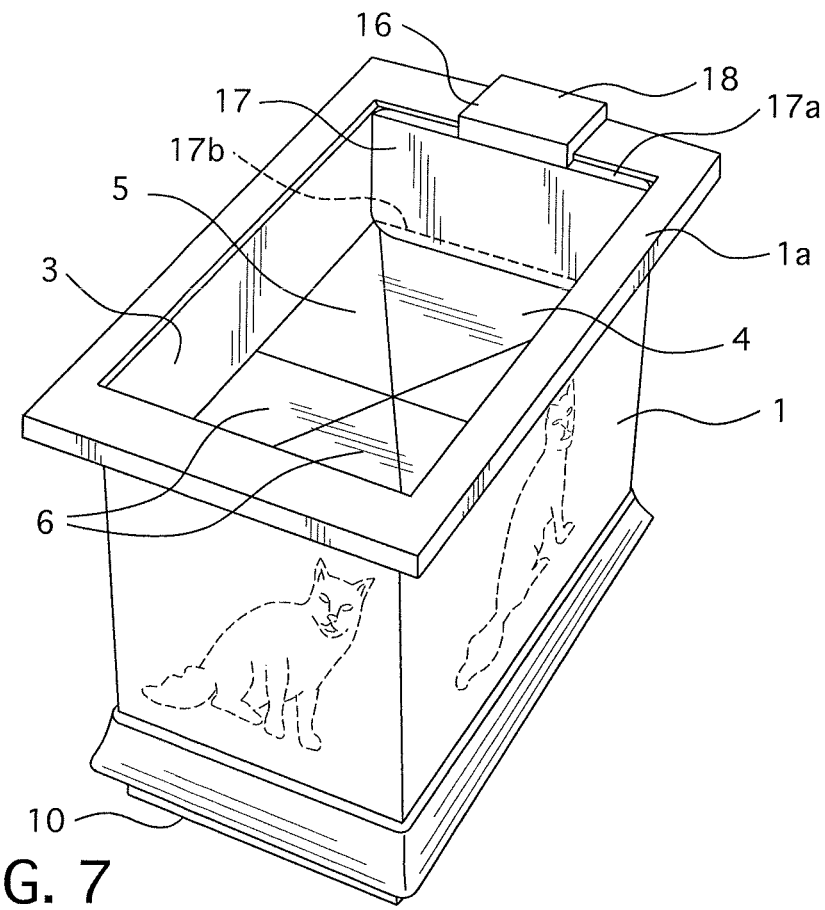
FIG. 7 shows a perspective view of the litter box with an alternative shape.

With reference then to FIGS. 1-7, shown is the instant litter box having an upper box or housing 1. Housing 1 is a container having a side wall 2 which defines an interior 3 and further has a bottom surface 4 within the interior 3. Housing 1 may include any type of design or decal on its surfaces and can be made of any rigid or semi-rigid material such as plastic, aluminum, or wood. Bottom surface 4 is formed from multiple (more than one) trap doors, specifically a main door 5 and multiple secondary doors 6. Housing 1 and thus bottom surface 4 can take any geometric form such as a hexagon (FIG. 1) or rectangle (FIG. 7). Housing 1 is adapted to connect to a lower box 10 such that the bottom surface 4 of housing 1 would be disposed over the lower box 10. Lower box 10 can be any type of container or waste can. For instance, although independent and not critical to the instant invention, lower box 10 can be a generally rectangular container or conform to the shape of housing 1 such that the housing 1 can rest thereon as shown.

In the preferred embodiment and as will be further described with reference to the function of the trap doors (main door 5 and secondary doors 6 in combination) which form the bottom surface 4, the main door 5 and each secondary door 6 is preferably triangular in shape. The main door 5 therefore has a fixed edge 7, a main slatted edge 8 and a main free edge 9. Each secondary door 6 being triangular in shape similarly has a connecting edge 11, a slatted edge 12, and an un-slatted edge 13. The secondary doors 6 are ancillary doors which essentially surround the main door 5 wherein two of the secondary doors 6 are adjacent to the main door 5 each on either side thereof (left and ride of main door 5). Depending on the shape of the bottom surface 4 the number of secondary doors 6 may vary but it is critical that there are at least the two secondary doors 6 each of which are adjacent to the main door, i.e. one to the left and one to the right of the main door 5.

Each secondary door 6 further comprises a slat 14 connected below the slatted edge 12 on an underside thereof traveling most (entire or more than half of the edge preferably) of the length of the slatted edge 12 as shown. In one embodiment, "slat" as herein defined means a detachable, separate component wherein each slat 14 is generally a thin strip of material which is fastened, shown here using screws, just under the slatted edge 12 to extend just beyond the slatted edge 12. Each slat 14 can be slightly angled upward from back to front and further help seal the seams defined by each door 5, 6. In this "detachable" embodiment the slat 14 can also be removed for repair or replacement. It should be understood, however, that "slat" as defined herein can be an embodiment where the slat 14 is integral to each door 5, 6 by way of a rabbit cut for example where the door piece is square-cut on either side such that the slatted edge 12 is in one plane and the un-slatted edge 13 is non-coplanar to the slatted edge 12 resembling generally a "Z" in cross-section.

The un-slatted edge 13 of each secondary door 6 excludes the slat 14. The connecting edge 11 of each secondary door 6 is pivotally attached to the side wall 2, preferably using a door hinge 15 screwed at this connecting edge 11, i.e. hingedly attached. In this manner, upon a downward force against a protruding slat 14 of a neighboring secondary door 6, for instance to the right of the main door 5, that neighboring secondary door 6 would also be forced downward. In opposite, motion resulting from an upward force by the pulling up of the main door 5 lifts the slat 14 of the left secondary door 6 up against the un-slatted edge 13 of an adjacent secondary door 6 causing a "domino effect".

Thus, to initiate this trap door motion, a latch mechanism 16 is provided as a means for manipulating the main door 5 upwards and downwards. Still referencing FIGS. 1-7, a latching mechanism 16 further comprises an overhang 17 which is disposed downward towards the bottom surface 4 within the interior 3. Latching mechanism 16 has an overhang top 17a and an overhang bottom 17b. A latch plate 18 is fixed generally perpendicular to the overhang top 17a and hingedly connected to the top edge 1a of housing 1 as shown. A movable handle 19 (by handle hinge 20 for example) is then connected to this latch plate 18, such that upon manipulation of the handle 19 the latch plate 18 and the overhang 17 can be pushed downward. In this manner the main free edge 9 can be pushed against the slat 14 of an adjacent or neighboring one of the secondary doors 6 to provide a downward force against that secondary door 6, which in essence starts a chain reaction to force all secondary doors 6 downward since each slat 14 of each secondary door 6 will be engaged. Thus, the opening will be revealed. Upon closing, the bottom surface 4 of the housing 1 remains closed and sealed after the chain reaction is starting in the opposite direction by the pulling force against the other neighboring slat 14 relative to the main door 5. The latch plate 18, being perpendicular to the overhang 17, therefore maintains the main door 5 in a level position.

Figure 8:
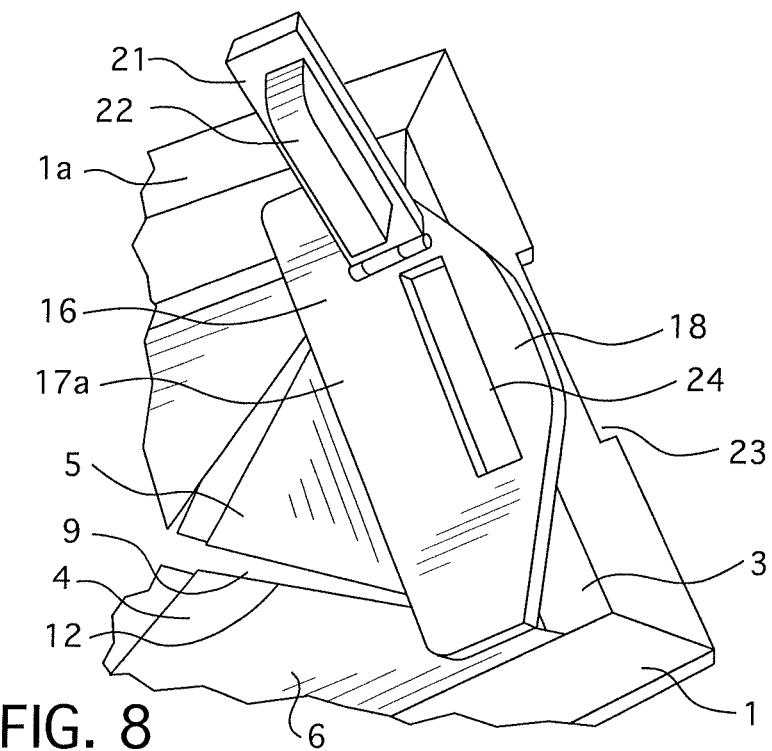
FIG. 8 shows a perspective view of an alternative embodiment of the latching mechanism.

FIG. 8 shows an alternative embodiment of the latch mechanism 16. An overhang 17 within the interior 3 has an overhang top 17a and an overhang bottom (not shown) such as above. The latch plate 18 is also similarly fixed to the overhang top 17a for disposition over the top edge 1a, but here a locking arm 21 is pivotally attached to the latch plate 18 as shown, such that upon manipulation of the locking arm 21 the latch plate 18 and the overhang (not shown) can be pushed downward. The locking arm 21 includes a downwardly disposed lip 22 which is adapted to overhang the top edge 1a of the housing 1 and/or a groove 23 defined therein upon depressing the locking arm 21 downward. Lip 22 projects through latch slot 24 through the top of the latch plate 18, wherein as lip 22 overhangs and engages top edge 1a while through latch slot 24, overhang is also secured and maintained vertically to further position the respective main door 5 in a level position since main door 5 is perpendicularly affixed to overhang. To disengage latching mechanism 16, locking arm 21 is lifted upward such that lip 22 is pulled away from latch plate 18 and therefore away from top edge 1a. Previously horizontal/level main door 5 can then be pushed downward towards the bottom surface 4.

In use then, as a result of the aforementioned forces, main free edge 9 of the main door 5 pushes downward on the neighboring slatted edge 12 of the adjacent secondary door 6. The un-slatted edge 13 or free edge of this adjacent door 6 in turn pushes downward on slatted edge 12 of the third door (relative to the main door). As above this resulting "domino" effect pushes all doors downward to open the bottom surface 4 of housing 1, resulting in the ability of the user to empty the contents of the housing 1, for instance into any bottom box 10 simply by the movement of the latch mechanism 16. Any contents therefore in the housing 1 can be dropped from bottom surface 4 of housing 1 and into the center of the bottom box 10 for further containment or into any type of waste container or similar. Accordingly, soiled cat litter residing in housing 1 can be dumped into bottom box 10, then sealed therein as bottom surface 4 is subsequently closed. Any bottom box 10 containing the soiled litter can periodically be dumped and the contents removed, or the housing 1 (top box) itself can be emptied into a trash container, resulting in an easy-to-use, sanitary cat litter box system.

I claim:

1. A cat litter box, comprising:
    a housing having a side wall defining an interior;
    a bottom surface within said interior, said bottom surface formed from a main door and multiple secondary doors;
    wherein two of said secondary doors are adjacent to said main door each on either side thereof, and each secondary door is triangular in shape and has a connecting edge, a slatted edge, and an un-slatted edge, each secondary door further comprising a slat connected below said slatted edge on an underside thereof, said slat traveling most of a length of said slatted edge, wherein said connecting edge is hingedly attached to said side wall; and
    wherein said main door is triangular in shape and has a fixed edge, a main slatted edge and a main free edge; and
    a means for manipulating said main door upwards and downwards such that said main free edge can be pushed against said slat to provide a downward force against each secondary door to reveal an opening.

2. The cat litter-box of claim 1, further comprising a lower box adapted to be situated under said bottom surface.

3. A cat litter box, comprising:
    a housing having a top edge, a bottom surface, and a side wall defining an interior, said bottom surface comprised of a main door and multiple secondary doors;
    wherein two of said secondary doors are adjacent to said main door each on either side thereof and adapted to move in conjunction with said main door to define an opening;
    a latching mechanism, further comprising:
        an overhang within said interior, said overhang having an overhang top and an overhang bottom;
        a latch plate fixed to said overhang top and hingedly connected to said top edge;

a handle connected to said latch plate, such that upon manipulation of said handle said latch plate and said overhang can be pushed downward; and a main door connected to said overhang bottom and perpendicular thereto, whereby upon said downward pushing of said overhang said main door is lowered, and as a result each secondary door is simultaneously lowered to reveal said opening.

4. The cat litter box of claim 3, further comprising a lower box adapted to be situated under said bottom surface.

* * * * *